United States Patent
Avadhanam et al.

(10) Patent No.: US 6,778,977 B1
(45) Date of Patent: Aug. 17, 2004

(54) METHOD AND SYSTEM FOR CREATING A DATABASE TABLE INDEX USING MULTIPLE PROCESSORS

(75) Inventors: Srikanth R. Avadhanam, Redmond, WA (US); Milind M. Joshi, Bellevue, WA (US); Ajay Kalhan, Redmond, WA (US); Srikumar Rangarajan, Redmond, WA (US); Tsvi M. Reiter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 305 days.

(21) Appl. No.: 09/838,691

(22) Filed: Apr. 19, 2001

(51) Int. Cl.[7] .............................................. G06F 7/00
(52) U.S. Cl. .......................................... 707/2; 707/101
(58) Field of Search ........................... 707/3, 101, 201, 707/10; 709/400, 215, 312; 382/171, 172, 178

(56) References Cited

U.S. PATENT DOCUMENTS

| | | | | |
|---|---|---|---|---|
| 5,204,958 A | * | 4/1993 | Cheng et al. | 707/102 |
| 5,551,027 A | * | 8/1996 | Choy et al. | 707/201 |
| 5,692,171 A | * | 11/1997 | Andres | 707/2 |
| 5,765,158 A | * | 6/1998 | Burrows | 707/101 |
| 5,799,311 A | * | 8/1998 | Agrawal et al. | 707/102 |
| 5,802,357 A | * | 9/1998 | Li et al. | 707/2 |
| 5,842,208 A | * | 11/1998 | Blank et al. | 707/7 |
| 5,857,180 A | * | 1/1999 | Hallmark et al. | 707/2 |
| 5,870,752 A | * | 2/1999 | Gibbons et al. | 707/102 |
| 5,960,194 A | * | 9/1999 | Choy et al. | 707/102 |
| 6,078,923 A | * | 6/2000 | Burrows | 707/101 |
| 6,427,148 B1 | * | 7/2002 | Cossock | 707/7 |
| 6,532,458 B1 | * | 3/2003 | Chaudhuri et al. | 707/2 |
| 6,567,810 B1 | * | 5/2003 | Singhal | 707/10 |

OTHER PUBLICATIONS

DeWitt, David et al. Parallel Sorting on a Shared Nothing Architecture using Probablisitic Splitting. 1992. pp. 1–24.*

Davidson, Wayne. Parallel Index Building in Informix Online 6.0. □□p. 103.*

Geotz Graefe, Diane L. Davidson, "Encapulation of Parallelism and Architecture–Independence in Extensible Database Query Execution," TSE 19(8): 749–764 (1993).

Geotz Graefe, "Volcano—An Extensible and Parallel Query Evaluation System," TKDE 61(1): 120–135 (1994).

Geotz Graefe, Iterators, Schedulers, and Distributed–memory Parallelism, Software—Practice and Experience 26(4): 427–452 (1996).

* cited by examiner

*Primary Examiner*—Kim Vu
*Assistant Examiner*—Monplaisir G Hamilton
(74) *Attorney, Agent, or Firm*—Merchant & Gould P.C.

(57) ABSTRACT

A method and system for creating an index for a database table of records in a computer environment having a plurality of processing units wherein each processing unit has access to the database table. The method first determines partition delimiters wherein each partition delimiter separates the database table into non-overlapping partitions of records. Each of these partitions is dedicated to one processing unit for index creation. Next, each processing unit independently creates a sub-index, i.e., different processing units create at least two sub-indexes. Last, the method merges the sub-indexes together to create a final index related to the database table.

18 Claims, 10 Drawing Sheets

| | 212 | 214 | 216 | 218 | 220 | 222 | 200 |
|---|---|---|---|---|---|---|---|
| | Record Number | Last Name | First Name | Age | Birth Date | Title | |
| 202 | 1 | Smith | John | 21 | 01/01/1980 | Manager | |
| 204 | 2 | Jones | Lisa | 35 | 02/02/1965 | Associate | |
| 206 | 3 | Doe | John | 22 | 12/03/1980 | Associate | |
| 208 | 4 | Schmitt | Mary | 51 | 01/25/1950 | Manager | |
| 210 | 5 | Phillips | Frank | 33 | 03/01/1968 | Associate | |

METHOD AND SYSTEM FOR CREATING A DATABASE TABLE INDEX USING MULTIPLE PROCESSORS

TECHNICAL FIELD

The present invention relates to methods and systems for the creating database indexes. More particularly, the present invention relates to the creation of such an index in a multiprocessor environment.

BACKGROUND OF THE INVENTION

In order to manage large quantities of data, computer database applications have been developed to organize and store the data in a logical manner. Typical computer databases comprise a significant number of records of information, wherein each record comprises a predetermined number of fields. Additionally, a database management system is typically used to provide the software tools to manipulate the database more simply. Example database management systems include Microsoft® Access, Microsoft® SQL Server, among others. A typical database management system provides the user the ability to add, modify or delete data, and the ability to search, sort, or recombine records in the database. Moreover, the usual system also provides functionality related to maintaining the security and integrity of the database data.

In managing large quantities of data, a database application alone may not provide the speed and flexibility in accessing desired data. Therefore, "indexes" are often used to provide a presorted view of the database, or more particularly, a portion of the database known as a table. An index is a representation of a database table that is sorted by a predetermined field or fields within the records. Using these indexes, queries may be resolved more efficiently since each index provides relatively short paths to desired information.

As an example, consider a personnel or employee database table incorporating many records of information and wherein each record relates to a one employee. Each record contains numerous fields that contain specific data or other identifying elements for that one employee, such as last name, age, date of birth, sex, etc. Assume further that the entire database table is sorted on the last name of each employee, e.g., by placing the names in alphabetical order. When a user desires information about employees other than something based on name, such as when a user wants to know all employees under the age of 30 for example, there is no simple way to discern this information. Typically, the entire database table must be sorted or at least evaluated based on age and then the user is able to locate the desired records. Such a sorting or scanning process consumes a significant amount of time. For this reason, table indexes may be created that comprise sorted information based on key fields such as age, birth date, sex, etc. Therefore, when information is needed based on one of these fields, i.e., when performing a query, the most relevant index may be used to quickly locate specific records of interest.

In order to generate a table index, a typical database management system must access each record and analyze the particular field or fields, i.e., key field(s) relevant to the particular index, e.g., the age field for the an age index. Using the values within the key field, the database management system orders, sorts or otherwise positions each record into a particular location as compared with the other records. This process can take considerable time because each record must be accessed from the disk and analyzed and then sorted.

It is with respect to these and other considerations that the present invention has been made.

SUMMARY OF THE INVENTION

The present invention relates to the creation of a database table index using more than one microprocessor. In order to use more than one processor to create the index, a pre-processing phase partitions the various database table records amongst the multiple processors. Each partition relates to non-overlapping data such that each processor can operate independently of the others to create a sub-index. Once the various sub-indexes are created, a merge operation merges all the sub-indexes into a final, complete index. An upper or top-level index object is created that relates to the combination of the various indices created by the processors.

In accordance with certain aspects, the present invention relates to a method of creating an index for a table of records in a computer environment having a plurality of processing units wherein each processing unit has access to the database table. The method first determines partition delimiters wherein each partition delimiter separates the table into non-overlapping partitions of records. Each of these partitions is dedicated to one processing unit for index creation. Next, each processing unit independently creates a sub-index, i.e., different processing units create at least two sub-indexes. Last, the method merges the sub-indexes together to create a final index related to the database table.

In accordance with other aspects, the present invention further involves each processing unit accessing the database table records in parallel, i.e., wherein each processing unit access each of the records and then filters the accessed records to keep only relevant records for its sub-index. Each processor then sorts its kept records and generates a data structure based on the sorted records. The data structure is essentially the sub-index and may be a balanced tree, i.e., a B-Tree having multiple levels, and it may or may not be a clustered index.

In accordance with other aspects, the present invention also gathers sub-index statistical information and later stitches sub-index statistical information together to create a final index statistical information data structure. The method of gathering sub-index statistical information involves evaluating record field information; generating a histogram relating to the evaluation of the record field information; creating a linked list of data objects related to the histogram; determining variance values between consecutive data objects and storing the variance values in a heap; and reducing the linked list by combining data objects having a relatively low variance value between the respective data objects. The act of stitching the sub-index statistical information involves merging the heap information for each sub-index; linking the linked lists for each sub-index to create a stitched linked list; determining variance values between linked objects; determining a relatively low variance value; and reducing the stitched linked list by combining linked objects associated with the relatively low variance value to created a combined data object. Additionally, the combined data object is linked within the stitched linked list to a previous data object and a subsequent data object. A first variance value between the combined data object and previous data object and a second variance value between the combined data object and the subsequent data object are then calculated and stored in the merged heap so that the stitched linked list may be reduced. The stitched linked list may be reduced to a predetermined number of objects or until the lowest variance value is above a predetermined threshold value.

In accordance with other embodiments, the present inventive method act of determining partition delimiters involves sampling the database table records to determine an approximate distribution of the values in the key field; creating a histogram based on the sampled information; and evaluating the histogram to determine the partition delimiters. Further, this determination may involve determining a processor goal value based on the number of processors in the computer system; determining a least common multiple value based on the processor goal value; and determining whether the histogram information may be substantially evenly split into the least common multiple value number of partitions. If so, creating the partition delimiters based on the least common multiple value or, if not, adjusting the processor goal to determine a new least common multiple value to determine partition delimiters to eventually assign or allocate substantially equal numbers of records to each partition.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

DETAILED DESCRIPTION OF THE INVENTION

Figure 1:
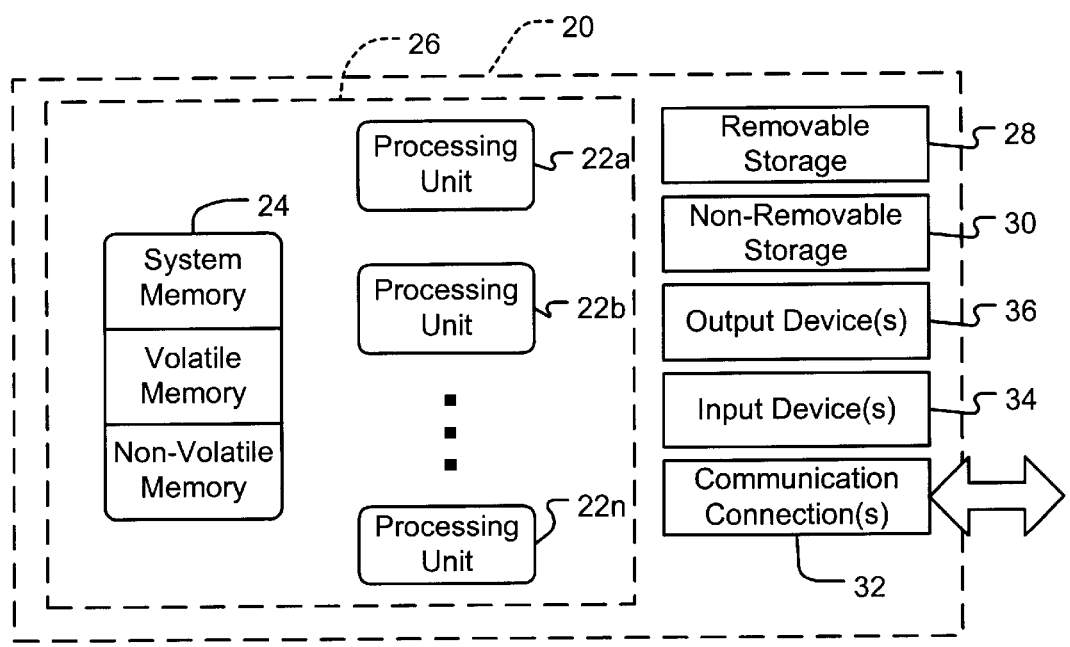
FIG. 1 illustrates a computer system incorporating a database management system of the present invention.

A computer system 20 that performs a process of creating an index of database records based on key fields or attributes according to the present invention is shown in FIG. 1. The system 20 has multiple processors 22 and a shared memory 24. In an embodiment of the invention, the system has two processors 22a and 22b, but in other embodiments, the system may have more than two processors, e.g., n processors as shown in FIG. 1. The processors 22 share the same memory 24, wherein the memory 24 stores database information. Each of the processors 22 performs index creation for a predetermined subset of the database information in memory 24 in accordance with the present invention, as described below. In alternative embodiments having more than two processing units, all processing units may perform index creation but not all processing units are required to participate. Indeed, practically any number of processing units may participate in index creation, independent of the actual number of processing units in the system 20.

In its most basic configuration, computing system 20 is illustrated in FIG. 1 by dashed line 26. Additionally, system 20 may also include additional storage (removable and/or non-removable) including, but not limited to, magnetic or optical disks or tape. Such additional storage is illustrated in FIG. 1 by removable storage 28 and non-removable storage 30. Typically, the bulk of the database information is stored in such additional storage. Computer storage media includes volatile and nonvolatile, removable and non-removable media implemented in any method or technology for storage of information such as computer readable instructions, data structures, program modules or other data. Memory 24, removable storage 28 and non-removable storage 30 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 20. Any such computer storage media may be part of system 20. Depending on the configuration and type of computing device, memory 24 may be volatile, non-volatile or some combination of the two.

System 20 may also contain communications connection(s) 32 that allow the device to communicate with other devices. Communications connection(s) 32 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 20 may also have input device(s) 34 such as keyboard, mouse, pen, voice input device, touch input device, etc. Output device(s) 36 such as a display, speakers, printer, etc. may also be included. All these devices are well known in the art and need not be discussed at length here.

Figures 2, 3:
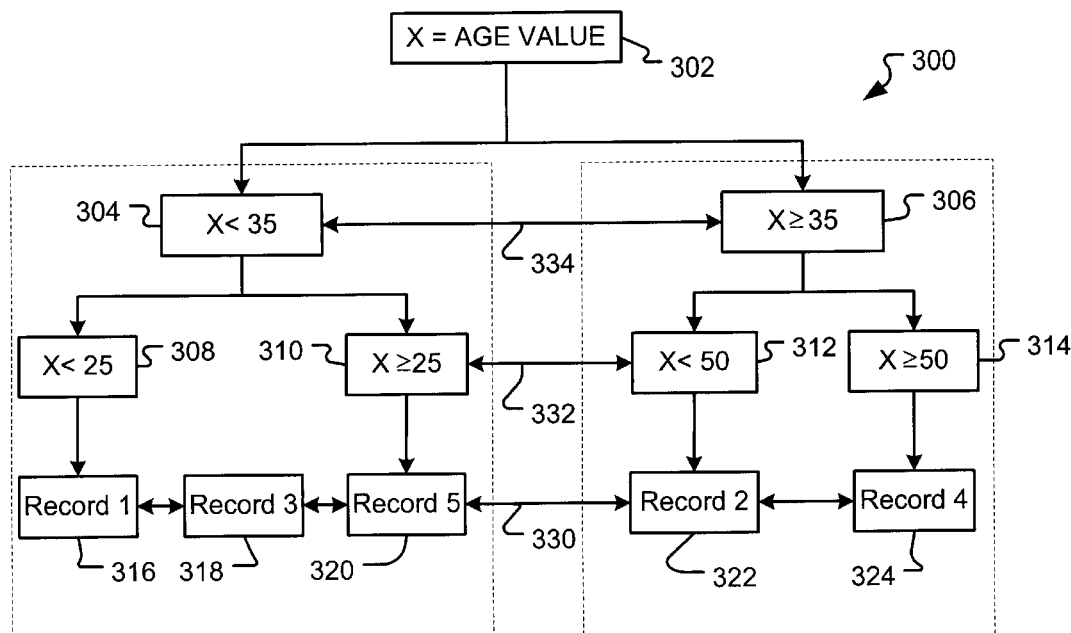
FIG. 2 is a portion of a database table of records that may be indexed according to principles of the present invention.
FIG. 3 illustrates a representative multi-level index created by the present invention.

FIG. 2 represents a portion of a database table stored on a computer system such as a computer system 20 shown in FIG. 1. The particular information stored in the database table 200 represents employee information, yet the present invention may be used with any database having records of information related to any type of data. The database table 200 comprises numerous rows or records 202, 204, 206, 208 and 210. Each record consists of at least one field of data, e.g., fields 212, 214, 216, 218, 220 and 222. In this particular example, field 212 comprises database information, such as the record number, that is merely an identification value for use by the database management system. On the other hand, fields 214, 216, 218, 220 and 222 contain employee specific information related to the particular employee. For instance, field 214 stores information related to the last name of each employee. Similarly, fields 216, 218, 220 and 222 indicate record elements for first name, age, birth date and title respectively. Although FIG. 2 only displays five records, the table 200 may actually incorporate hundreds, millions or billions of records. Consequently, the table 200 is only meant to illustrate principles and not limitations of the present invention.

FIG. 3 illustrates a sample multiple-level index 300 that may be generated for the portion of the table 200 shown in FIG. 2 in accordance with the present invention. Index 300 is a data structure that may be traversed to locate particular records of interest. In an embodiment of the invention, the data structure 300 is a balanced tree or a "B-Tree". In alternative embodiments however, other data structures may be implemented as indexes to provide relatively short access paths to relevant or desired records of information.

The top-most object 302 of the data structure 300 indicates the type of information or key field that was used in creating the index. In this particular example, the index 300 has been generated based on the relative ages of the employees represented by the records displayed in FIG. 2. First-level objects 304 and 306, positioned below the top-most object 302, provide navigation opportunities for a particular query. Similarly, second-level object 308, 310, 312, and 314 provide further navigational points in locating specific records. That is, the first and second level objects are used during traversal of the index 300 to navigate to specific records of interest based on a supplied query. The second-level objects 308, 310, 312 and 314 point to objects 316, 318, 320, 322 and 324 which, in turn, point to or otherwise provide access to particular records in the table 200. In particular, objects 316, 318, 320, 322 and 324 relate to records 202, 206, 210, 204 and 208 respectively.

The index 300 may be efficiently traversed to locate particular records of interest. By way of example, a query may be supplied to the database manager requesting information related to specific employees that are below the age of twenty-five (e.g., x<25). The index 300 may be traversed by testing the first level objects 304 and 306 to determine which path to traverse, i.e., path along 304. Following the testing of the first level objects, only second level objects 308 and 310 need to be tested. Since the query only requests ages less than twenty-five, then the traversal process ends with the testing of object 308. This example query process provides a pointer to record one, which in turn provides access to record three, i.e., the records that contain information for employees that are under the age of twenty-five.

The index may be either a clustered or a non-clustered index. A clustered index relates to actually sorting all the records in the table based on the key field and maintaining sorted records. Therefore, objects 316, 318, 320, 322 and 324 are the actual records 202, 206, 210, 204, and 208 respectively in a clustered index. A non-clustered index relates to maintaining pointers to the actual records. Thus objects 316, 318, 320, 322 and 324 contain pointer information to the entire records 202, 206, 210, 204, and 208 respectively. Additionally, however, in a non-clustered index the objects 316, 318, 320, 322 and 324 may contain other information related to its particular record, such as the key columns of the index, as well as the pointer information, such as another attribute value, etc.

According to the present invention, the index 300 is created using more than one processing unit, e.g. units 22 shown in FIG. 1. The index 300 is composed of two sub-indexes 326 and 328, wherein a different processing unit created each of the sub-indexes 326 and 328. Once created, the two sub-indexes 326 and 328 were merged to create the final index 300. During the merge operation the upper-level object 302 was created along with links 330, 332 and 334, which link same or similar-level objects. The merge process is described in more detail below.

Figure 4:
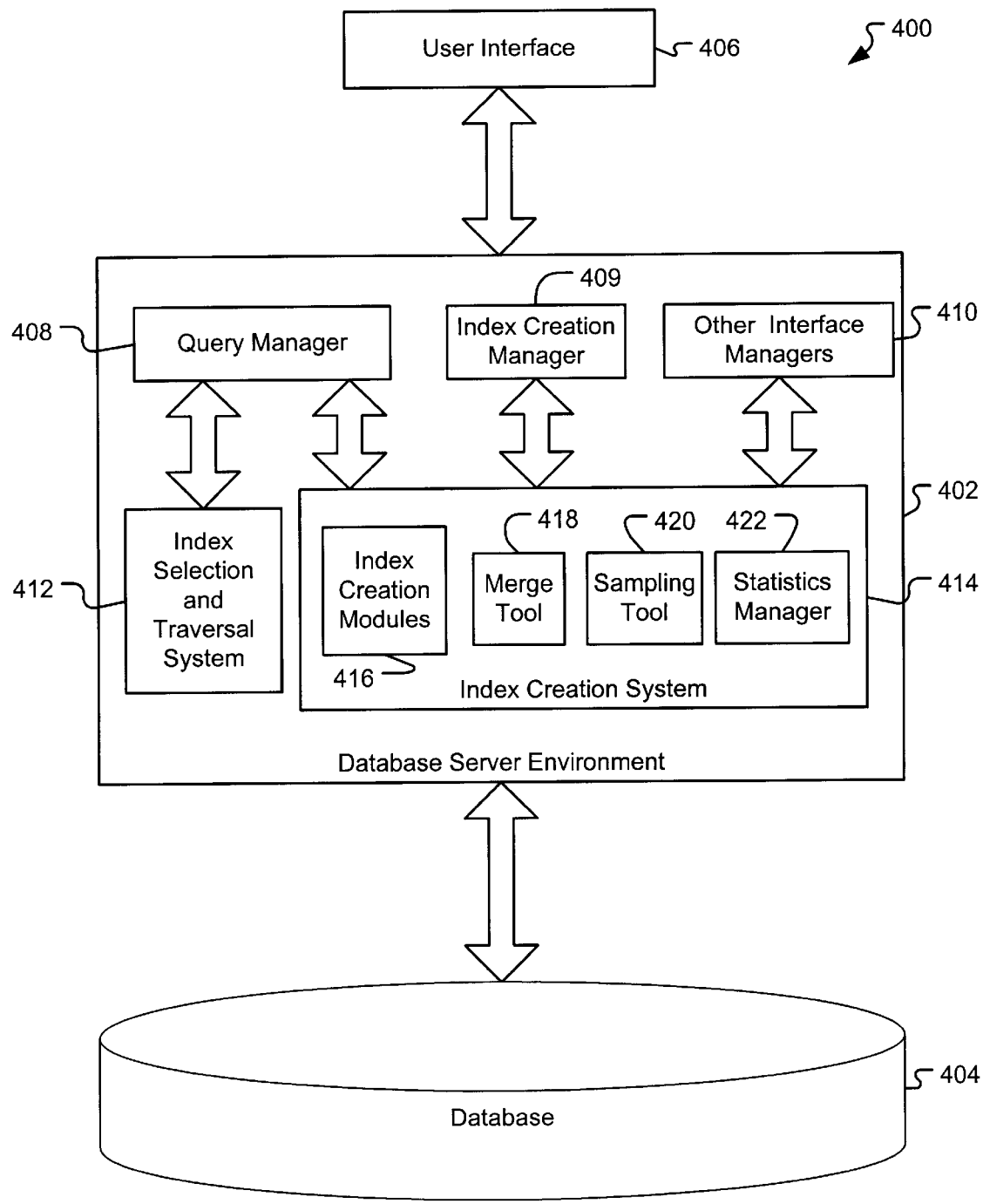
FIG. 4 illustrates a software environment for implementing the present invention, the software environment incorporating an index creation system.

FIG. 4 illustrates a suitable software environment 400 of functional software components in which the present invention may be implemented. The software environment 400 is only one example of a suitable environment and is not intended to suggest any limitation as to the scope of use or functionality of the invention. Other well-known environments, and/or configurations that may be suitable for use with the invention may implement the present invention.

The software environment 400 incorporates a database management server environment 402 that incorporates aspects of the present invention. The environment 402 operates to manage database 404. In an embodiment of the invention, the database 404 relates to records of information stored in persistent storage, e.g., the table of information shown and described above in conjunction with FIG. 2. However, the database 404 may be any type of stored information that may be accessed and sorted.

The environment 402 communicates with database administrators or other computer modules (collectively referred to herein as "users") through user interface 406. The user interface 406 relates both to any application or software component that submits queries to environment 402 for resolution or any other module that provides user access to the database 404 for management purposes. In a particular embodiment, the user interface 406 includes application software that allows the user of database 404 to store and retrieve data in database 404. The user interface 406 may include or require the use of an SQL (Structured Query Language) interface component that provides a mechanism for users to generate ad-hoc queries of the database 404. The user interface 406 may also include report components that generate reports based on data in the database 404. The present invention, however, should not be limited to any particular type of user interface 406.

In order to manage database 404, the environment 402 has a query manager 408, an index creation manager 409 and potentially other interface managers 410. The various modules or managers 408, 409 and 410 receive information and commands from the user interface 406 and supply information back to the user interface 406. The managers may provide direct access to database 404 and/or they may provide representative information to the user interface 406 to ensure security and data integrity.

The query manager 408 receives queries from user interface 406, resolves the queries and supplies corresponding query results back through the interface 406. The query manager 408 utilizes an index selection and traversal system 412 to resolve particular queries. Essentially, once an index has been created as discussed below, the index is stored such that system 412 may analyze the various indexes and select the most relevant index for resolving the particular query. Referring to database table 200 (FIG. 2) as an example, the environment 402 may have stored indexes relating to age, title, birth date, etc. The index selection and traversal system 412 evaluates the various indexes and chooses the proper index to traverse. Moreover, the system 412, in this embodiment, performs the traversal of the index and supplies the results back to query manager 408. The system 412 may or may not actually access the database 404. Either way, the query manager is able to provide results to the user interface 406 that allows retrieval of pertinent information related to the database 404.

Although not shown, the query manager may utilize a query optimizer, a rules engine, a cost component, a selectivity estimator and a maxdiff histogram storage area. These items are described in more detail in U.S. patent application Ser. No. 09/652,942; entitled QUERY PLANNING USING A MAXDIFF HISTOGRAM, filed Aug. 31, 2000, which is assigned to the Assignee of the present application, and which is incorporated herein by reference for all that it discloses and teaches.

The index creation manager 409 receives index creation commands and criteria from the user interface 406. The index creation manager 409 supplies this information to an index creation system 414, which, in turn, creates and stores an index based on the supplied information. The index creation commands and criteria may relate to which portions of the database should be used in creating the index, or whether the entire database table should be indexed, which key field should be used as the primary sort element and whether other key fields should also be used, such as for secondary sorting. The information may relate to whether the index should store location information or create a separate representation of the sorted index, such as in a clustered index. Indeed, the information may include many other items that could be used by the index management system 414 in creating the index, as described in more detail below.

Besides the index creation manager 409, the query manager 408 may also interact with the index creation system 414. One particular situation that may cause the query manager to interact with the index creation system is when there is no index that relates to a particular query. In such a case the query manager may directly instigate the creation of an index using system 414 and supply the index criteria or key field information to the system, wherein the criteria relates to the supplied query. Thus, a relevant index will be present the next time a query is supplied to the query manager relating to that key field.

In alternative embodiments, other interface modules or managers 410 may also interact with the index creation system 414. In such a case, the other manager 410 simply provides an index creation request to the system 414 and the relevant criteria. Once received, the system 414 proceeds to create the index.

The index creation system 414 incorporates a plurality of index creation modules 416, a merge tool 418, a sampling tool 420 and a statistics manager 422. The creation modules 416 perform the parallel creation of an index based on received criteria using a plurality of processing units, such as units 22 shown in FIG. 1. Although shown as a single block, modules block 416 represents separate modules that produce portions or sub-indexes of the final index. Once each sub-index is created, the merge tool 418 merges the various sub-indexes into the final index. The sampling tool 420 samples the database table information to determine the most efficient means of splitting the records between the various index creation modules 416 prior to the actual creation of the index. Additionally, the sampling tool 420 may be used to sample the information to determine the number of modules 416 that should be used in creating the index. The statistics manager 422 is used to gather statistics of the database information during the creation of the index. The statistics manager also compiles a meaningful set of information based on the merged information gleaned from the merge tool 418.

Figure 5:
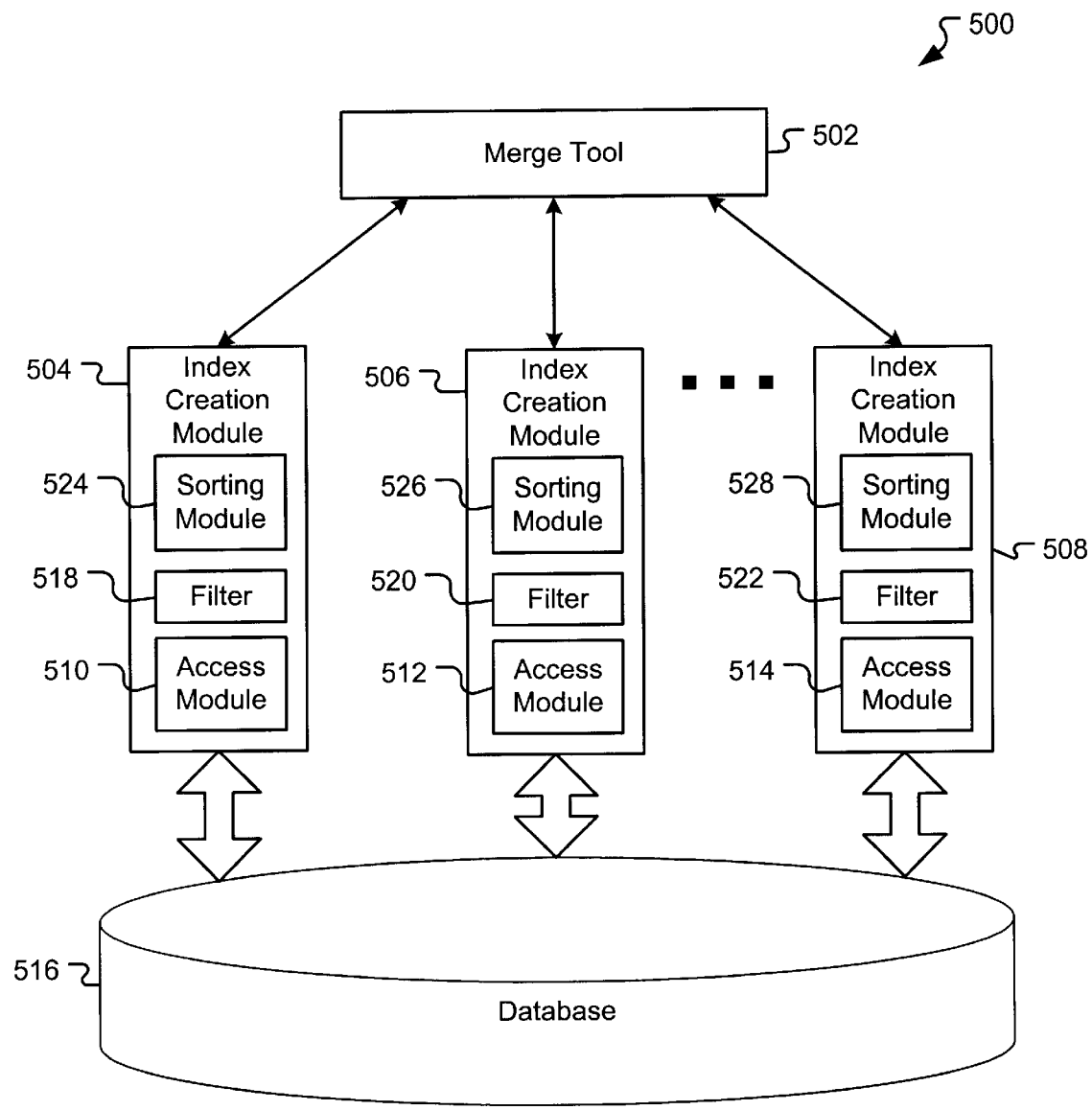
FIG. 5 illustrates elements of the index creation system shown in FIG. 4.

FIG. 5 illustrates the software components associated with the index creation modules 416. More particularly, the index creation modules block 416 (FIG. 4) is divided into separate index creation modules 504, 506 and 508 in FIG. 5 to better illustrate the separate modules used to create the final index. Although three index creation modules are shown in FIG. 5, the invention may be implemented with only two modules or with more than three modules. In an embodiment of the invention, each index creation module 504, 506 and 508 is associated with one processing unit, such as 22a, 22b and 22n (FIG. 1), respectively. In other embodiments, other combinations of index creation modules and processing units may be used.

The index creation modules 504, 506 and 508 each have an access module, such as modules 510, 512 and 514, respectively. These access modules access data records from database 516. Database 516 is similar to database 404 described above in conjunction with FIG. 4 and maintains a plurality of records having attributes or fields. Each of the access modules 510, 512, and 514 may read any or all the records from the database or a table within the database and store the read information into buffered memory, such as a cache memory. During the process of creating the index, each access module 510, 512, and 514 accesses each of the database table records for evaluation. Since all the modules 510, 512, and 514 share the same operating memory, which is common in multiprocessor environments, access conflicts may occur. However, as discussed below, such conflicts may actually improve the speed in creating an index in parallel since one processor may perform the relatively slow process of accessing the disk for the information, while the other processors may retrieve the information directly from the operating memory, which is relatively fast.

Each index creation module also has a filter, such as filters 518, 520, and 522. The filters 518, 520 and 522 are used in evaluating each record that is read or accessed by the access modules 510, 512, and 514, respectively. The filters 518, 520 and 522 store or cache only the relevant records for its particular index creation module. Essentially, each filter 518, 520 and 522 has different or unique criteria that it uses in determining which records to store. Therefore, although each record in the database 516 may be accessed and evaluated by all index creation modules, only one module will elect to store that information for its portion of the index, i.e., its sub-index.

Each index creation module 504, 506 and 508 also has a sorting module, such as sorting modules 524, 526, and 528. These sorting modules perform the actual sorting of the information cached by the filters 518, 520, and 522, respectively. The sorting modules 524, 526, and 528 also create sub-indexes based on the sorted information.

The sub-indexes created by the sorting modules 524, 526, and 528, and hence the index creation modules 504, 506 and 508 respectively are merged together by the merge tool 502 into a final index. The merge tool may also create a top-most object to identify the index. Additionally, the merge tool 502 may also physically position the final index onto persistent storage pages in such a manner that enables relatively rapid traversal of the index.

Having described the software environment for the present invention, the process or functional characteristics may now be described in more detail. Thus, the present invention may be described in the general context of computer-executable instructions, such as program modules, executed by one or more computers or other devices. Generally, program modules include routines, programs, object-oriented-type objects, components, data structures, etc. that perform particular tasks or implement particular abstract data types. Typically the functionality of the program modules may be combined or distributed as desired in various embodiments. Additionally, the logical operations of the various embodiments of the present invention may also be partially or wholly implemented as interconnected hardware or logic modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 6:
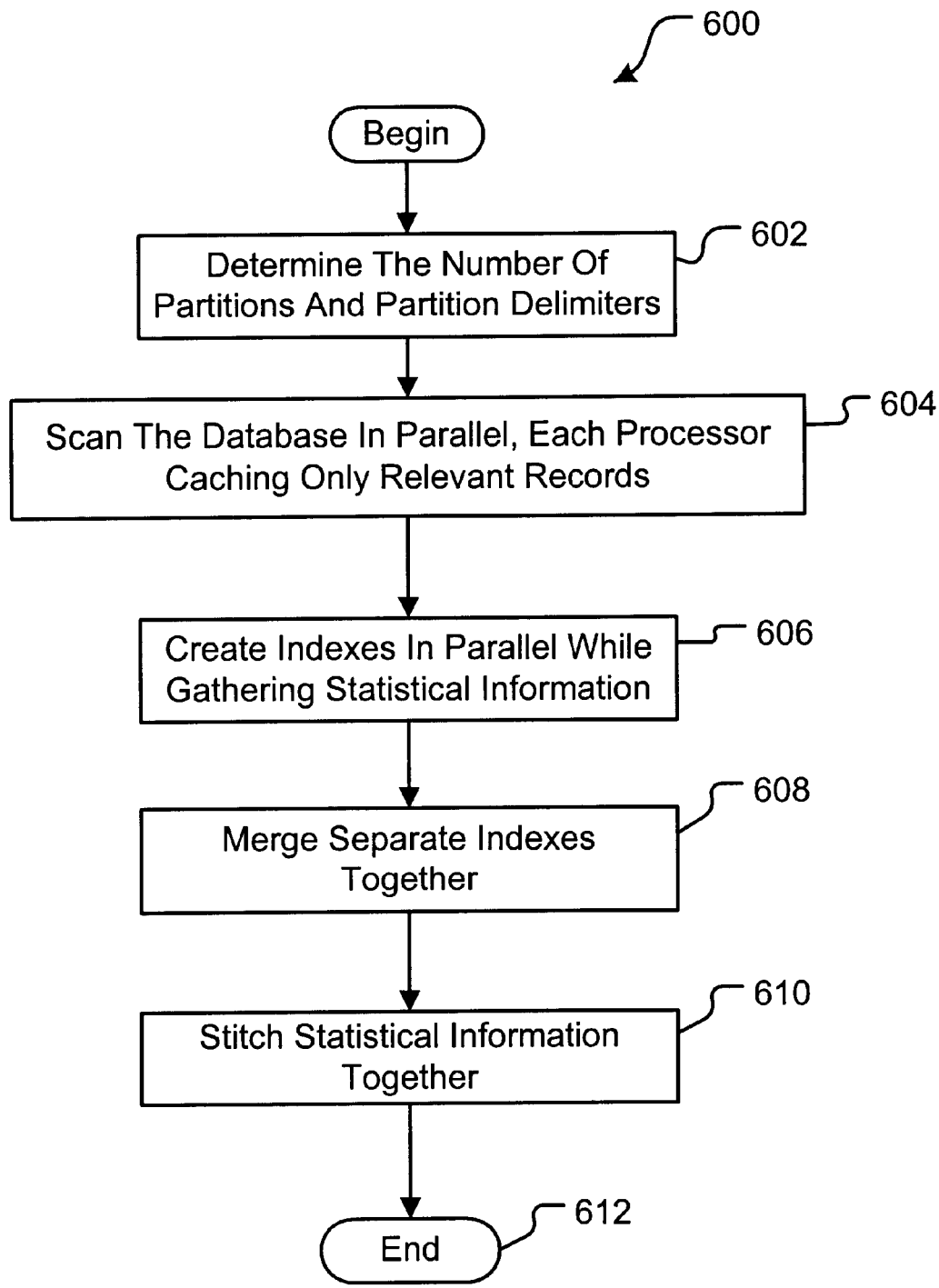
FIG. 6 is a flow diagram showing the operational characteristics performed by the index creation system shown in FIG. 4 in accordance with the present invention.

With respect to the index creation system 414 shown in FIG. 4, the modules perform a number of operations or phases in order to create an index using a plurality of processing units, e.g., units 22 shown in FIG. 1. The flow 600 of logical operations performed by the index creation system 414 during index creation is shown in FIG. 6. In an embodiment, index creation manager 409 (FIG. 4) or another manager (e.g., 408 or 410) initiates flow 600 as described above. In alternative embodiments, other means are used to initiate the flow of operations shown in FIG. 6, e.g., an automatic update, addition or deletion of a record may trigger the flow shown in FIG. 6. The flow 600 relates to parallel creation of an index, i.e., using more than processor to create the index. As such, a previous, anticipatory step may be to determine whether the system has more than one processor, or more than one available processor. Assuming this has been done and there is more than one processor available, the flow 600 may be initiated.

The flow 600 begins with a preprocessing phase which determines information related to the actual data in the database table. For instance, determine operation 602 samples the data in the database table to determine the approximate distribution of the data in the database table. The sampling process provides information that may be used to determine meaningful ways to partition the database table records based on the key field or attribute that is to be used for the index. Determine operation 602 also determines the actual partition delimiters to be used by the filters during the actual accessing or scanning act. As an example, given the database table shown in FIG. 2, assume that there are two processing units and the index is related to employee age. Determine operation 602 may sample the various records to determine what age should be used as a dividing point such that one processor accesses and indexes all the records under the determined age and the other processor accesses and indexes all the records related to employees over the determined age and that both processors index approximately the same number of records. In this example the determination operation 602 may determine that the age of 35 is a relatively meaningful partition delimiter. This partition delimiter, and potentially others, is stored for future use by the scan modules. More details of a particular embodiment for determining the number of partitions and partition delimiters, which essentially creates a plan for parallel index creation, are described below in conjunction with FIG. 7.

Following the determination operation 602, e.g., the preprocessing phase of the process, scan operation 604 scans the database table. Scan operation 604 involves the parallel scanning, by all participating processing units, of all the records in the database table. As each processing unit is scanning or accessing the various records, each processing unit only saves or caches the records that it determines to be relevant for its portion of the index based on the partition delimiters determined during operation 602. Consequently, continuing with the age example of the previous paragraph, each of the two processors will evaluate each record and cache only the records that are above or below the age of 35, i.e., one processor caches the records below the age of the 35 and the other processor caches the records above the age of 35. In an alternative embodiment, the selected records are not saved but merely passed to the sort module as discussed below.

In an embodiment of the invention, at runtime, multiple instances of scanning objects, e.g., access modules 510, 512 and 514 are created. These objects are created based on the number of processors that will be used during the creation of the index. In a particular embodiment, the scanning process 604 requests the operating system to allow the use of a predetermined number of processors, e.g., the number of available processors. Regardless, the scanning process 604 creates only the number of access modules as there are processors participating in the index creation process.

Importantly, in this particular embodiment, the number of partitions determined above at operation 602 is based on the various possible numbers of processors that may be allocated, since there it may be difficult to predict how many processors will actually be allocated at runtime. For example, if the number of processors that may be allocated equals four, then determination act 602 sets the number of partitions based on the potential of having two, three or four processors allocated to the task of creating an index. In such a case, twelve partitions, where twelve is the least common multiple of two, three and four, might be created so that each processor, whether there are two, three or four processors, can be allocated an equal number of partitions at runtime.

In an alternative embodiment, one processor may be used to scan the entire database table and, based on the partition delimiters, the one processor stores each different record into a unique buffer for one of the participating processors. As such, this embodiment does not utilize the other processors during the scanning process. Unfortunately however, if these other processors are available for use during the index creation phase, as allocated by the operating system, then these processors will be idle for the scanning process, which may reduce the overall performance of the index creation process.

Upon completion of scan operation 604, create act 606 creates sub-indexes in parallel. That is, create operation 606 relates to the simultaneous or parallel creation of the sub indexes by the multiple processing units. The individual acts of creating an index by each processor may actually correspond to any number of single-processor index creation methods, e.g., a multi-level index creation, cluster index creation, etc. Each processor performs index creation on a portion of the entire database table independently of the other processors and their index creation. However, in an embodiment, in order to create a final, uniform index, each processor creates a similar type of index, e.g., a multilevel non-clustered index in the form of a B-Tree data structure. Therefore, each independent sub-index may be merged together to form a final index for the entire database table.

Following creation act 606, merge operation 608 merges the sub-indexes created by creation act 606 into a final index. The merge operation 608 creates at least one upper-level or top-level data object that may be used in determining which index to use, and which direction the traversal may begin. The merge operation 608 ensures there is a top level data object that may be used in determining which index to use. Additionally, the merge operation 608 generally creates links or other pointer information to associate similar level index elements of the various sub-indexes. Moreover, the merge operation 608 may also connect actual records to provide traversal capability from one sub-index record to a record of another sub-index, e.g., from the last record of a sub-index to the first record of the next sub-index such as link 330 (FIG. 3). In essence, any index characteristics required in joining two or more sub-indexes to create a single index might be performed by the merge operation 608. Importantly, since the separate sub-indexes relate to non-overlapping groups of records, the merge process does not require interleaving or extensive evaluation.

Upon completion of the merge operation 608, stitch operation 610 stitches together any statistical information gleaned from process 606. That is, during the creation of each sub-index, statistical information related to the data in the records may be gathered, e.g., statistics may be gathered related to the number of employees of particular ages. This information is then evaluated and combined into an overall set of statistical information for the final index at stitch operation 610. Although shown as following the merge operation 608, in alternative embodiments, the stitch operation may also be performed in parallel with merge operation 608. Additionally, other embodiments may not utilize statistical gathering and may therefore not include the act of stitching this information.

Upon completion of the stitch operation 610, the final index is complete. At this point, the index may be stored and utilized by the query manager to resolve queries. Importantly, the index creation process involved multiple processors which operated relatively independently to create sub-indexes which were then merged together to create the final index. In order to reduce synchronization or extensive processing during the merge phase, the database table was sampled or otherwise manipulated to logically divide the various records into non-overlapping partitions. Consequently, each sub-index, which is based on one or more partitions, does not overlap with any other sub-index and therefore the merge phase is essentially a connecting of the various sub-indexes.

Having described the overall process of creating an index using multiple processors, the following discussion relates to more specific details in performing the various phases described above. That is, the following discussion details the preprocessing phase of sampling the database table and determining the partition delimiters, the creation phase, the merge phase and the statistical stitching phase.

Figure 7:
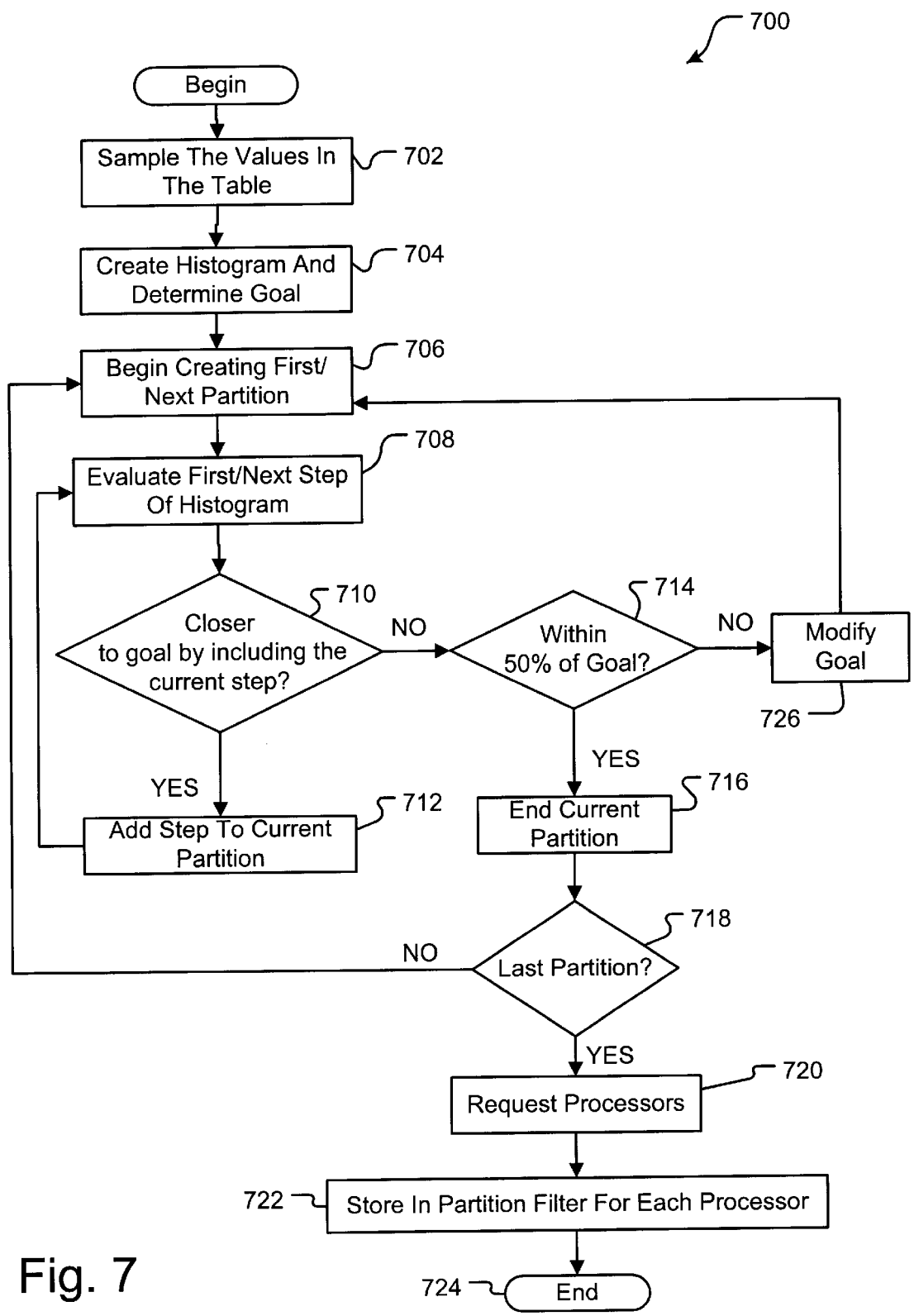
FIG. 7 is a flow diagram showing the operational characteristics performed in determining the number of partitions, the partitions being used to define the number of processors to be used in creating the index during the parallel creation act shown in FIG. 6.

FIG. 7 illustrates the functional characteristics for determining the number of partitions that are to be used in the parallel creation of the index. A partition relates to the logical divisions of the database-table data into non-overlapping groups. Additionally, the partitions contain a relatively equal number of rows or records. As an example, given the database table shown in FIG. 2, a logical partition delimiter, when two partitions are required, may be the use of age 35. That is, one partition relates to all records for employees under the age of 35 and the other partition relates to all employees of age 35 or older. When three partitions are created, then the partition delimiters may be ages 25 and 50, such that one partition relates to ages less than 25 years, another partition relates to ages between 25 and 50 and the last partition relates to ages greater than 50 years. Of course, for this example other partition elements could be used. However, each partition will contain information that does not overlap with another partition.

The process begins with sampling operation 702. Sampling operation 702 samples the data in the database table on the key field that will be used for the index. As an example, the sampling process may randomly sample age values for many of the records in the database table.

The information gleaned from the sampling operation 702 is used by create histogram operation 704 to create a histogram relative to the database table values. The histogram provides the approximate or expected distribution of the various values. Essentially, the histogram divides the data into steps and provides percentage values to each step. The percentage value relates to the percentage of records that contain values that fall within a particular step.

Continuing the age example in conjunction with FIG. 2, the histogram creation operation 704 may create a histogram based on sampled values of records 202, 208 and 210. Using these sampled age values the resulting histogram may indicate the expected distribution to be approximately 33% of the people between the ages of 20 and 30, i.e., the first step; 33% of the people to be between the ages of 30 and 40, i.e., the second step; and 33% of the people to be above the age of 40, i.e., the last step. As more samples are used, the histogram provides more meaningful results.

Using the histogram of information, an initial goal value may be determined. The goal value relates to the number of processors to be used during the parallel index creation process. That is, although the number of processors available in the system may be the number of processors used in the creation of the index, some embodiments may employ a more dynamic determination of the number of processors to be used. For instance, it may be determined that one of the processors cannot be used and therefore the method should be able to adjust accordingly, redistributing the records in a relatively even manner to maintain efficiency. Alternatively, it may be determined that the values are more easily and properly divided across fewer processors than available to the index creation process (e.g., wherein the values are true or false, such as male or female in the employee example, then only two of potentially many processors may be preferred). The goal value typically starts with the total number of processors in the system and is evaluated downward to a number that is meaningful given the data distribution in the histogram.

Following the creation of the histogram and generation of a first goal value, create first partition operation 706 begins the creation or allocation of steps to the first partition. To begin, operation 708 evaluates the first step of the histogram. The evaluation process 708 relates to a determination of the percentage value associated with the first step of the histogram. The percentage value is used to evaluate whether the step should be added to the first partition or whether the step should be allocated to the next partition.

In concert with this evaluation act 708, decision operation 710 decides whether the first step should be added to the first partition. In doing so a comparison is made between the number of rows or records that are already allocated to the first partition plus the number of rows in the current step of the histogram to a row-goal value. The row-goal value relates to the total number of rows or records in the database table divided by the goal value for processors. Thus, as an example, if the goal related to the number of processors is four, i.e., four processors to be used in creating the index, and the total number of rows in the database table is one thousand, then the row-goal value is equal to one thousand divided by four or two hundred fifty. Comparison 710 determines if the addition of the current histogram step to the current partition causes the total partition value of rows to become closer to the row-goal value, or whether the addition of the current histogram step causes the total partition value of rows to exceed the row-goal value beyond an acceptable amount. Of course, the addition of the current step may cause the partition to exceed the row-goal value, but by a relatively small amount which may be acceptable. In one embodiment, an acceptable amount may be defined as an amount that is closer to the row-goal value than the previous value when comparing the absolute value of the differences between the row-goal value and the respective values.

If the comparison act 710 determines that the addition of the current step to the current partition brings the current partition closer to the row-goal value, then flow branches YES to addition operation 712. Addition operation 712 adds the current histogram step to the current partition. Following addition operation 712, flow branches back to evaluation operation 708. Evaluation operation 708, in combination with comparison act 710, determines whether the next histogram step should be added to the current partition or whether adding such step would cause the partition to contain too many records, i.e., beyond an acceptable limit. As long as comparison act 710 determines that the current step should be added, operations 712, 708 and 710 are repeated.

If and when comparison act 710 determines that the addition of the current step will not bring the current partition closer to the row-value goal, determination act 714 determines whether the current partition is within 50% of the row-value goal. That is, determination act 714 compares the current partition against a threshold value based on the row-goal value to determine whether the current partition is within a predetermined range.

If the current partition is within the predetermined range, flow branches YES to operation 716 which ends the current partition. Following the end of the current partition, test operation 718 determines whether the current partition is the last partition to be created or whether there are more partitions to be created. If the current partition is not the last partition, flow branches NO to operation 706 to create another partition in the manner described above. If the current partition is the last partition, i.e., if there are no more partitions to create, then flow branches YES to request processor operation 720.

Request processor operation 720 requests the use of processors from the operating system. Accordingly, the request operation 720 requests the number of processors as determined by the goal value. Following request operation, store operation 722 stores relative partition delimiter information for each of the processors. Once stored, flow 700 ends at operation 724.

Importantly, in this particular embodiment, if operation 714 determines that the current partition row value is less than the predetermined threshold, e.g., 50% of the row-goal value, then flow branches NO to modify goal operation 726. Modify goal operation reduces the goal value related to the number of processors that will be used for the parallel creation of the index. Once this goal value is reduced, then the row-goal value for the various partitions is also modified. Following the modify goal operation 726, flow branches back to operation 706 to create the various partitions based on the new goal.

Figure 8:
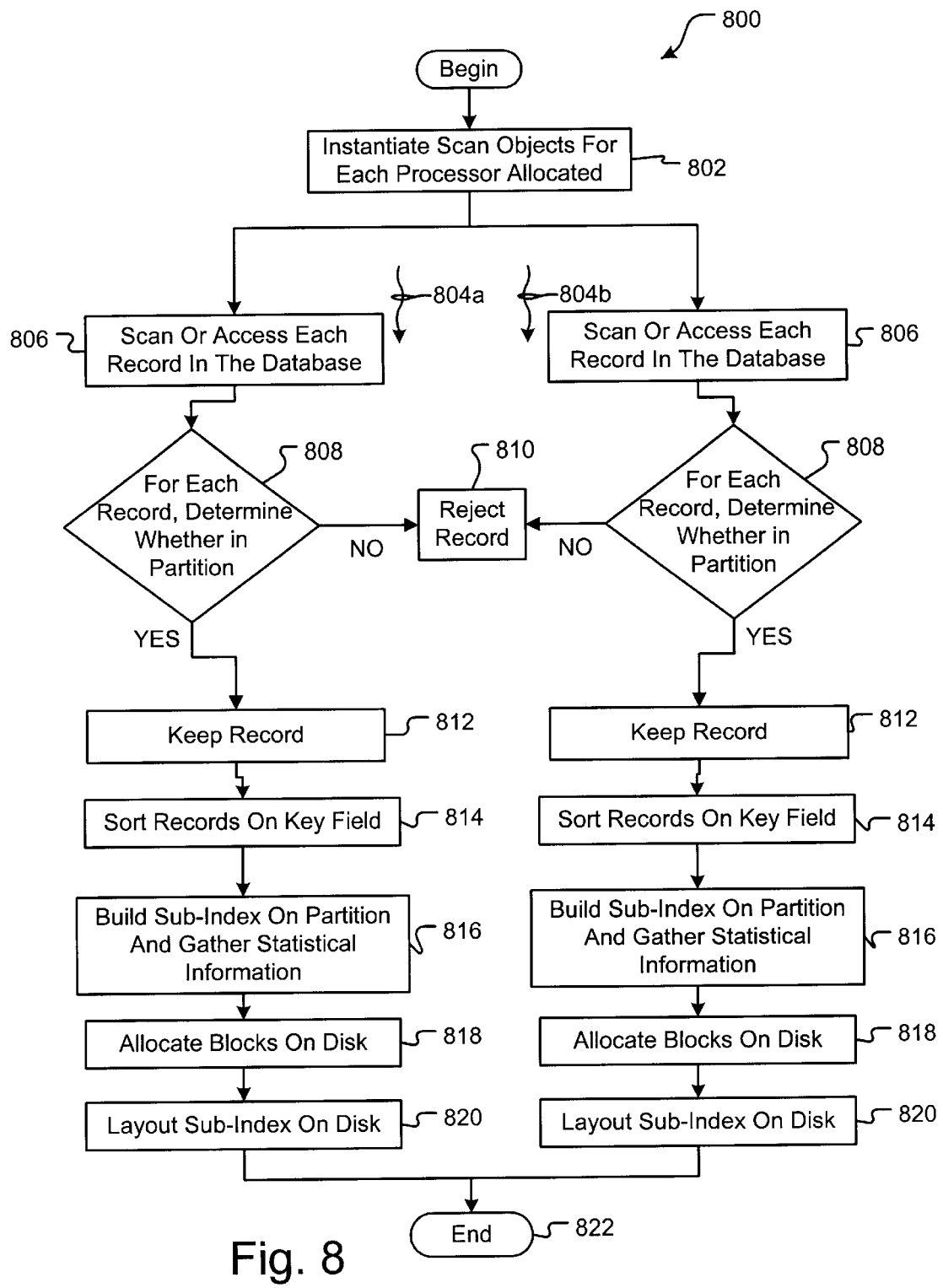
FIG. 8 is a flow diagram showing the operational characteristics performed in parallel scanning of the database table as part of the characteristics shown in FIG. 6.

A flow diagram showing the operational characteristics performed in parallel scanning of the database table is shown in FIG. 8. The process 800 represents a more detailed description of the process acts 604 and 606 shown and described above in conjunction with FIG. 6. The process 800 begins with instantiate operation 802 which instantiates access modules for each process that is involved with the parallel index creation process. Additionally, the instantiate operation 802 may also instantiate other objects such as the filter and sort objects required to perform the index creation process.

Once the access objects have been instantiated, at least two parallel threads are executed, such as threads 804a and 804b. Although the process 800 illustrates two parallel threads, other threads may be executed along with threads 804a and 804b. The two threads 804a and 804b are relatively similar and will therefore be described in conjunction with each other. Moreover, the two threads operate relatively independently of each other and therefore do not require synchronization during operation.

Each thread 804a and 804b begins with scan operation 806, which scans the database table. Scan operation 806 performs a disk access to read a record into memory. In some instances, the scan operation 806 for the different threads 804a and 804b conflict in an attempt to read the same record from the disk at the same time. However, such a conflict is beneficial since the second or later operation, such as scan operation 806 from thread 804b, may find the record in operating memory because the first or prior operation, such as scan operation 806 from thread 804a, has already accessed the record from the disk and temporarily stored that record in the operating memory, e.g., RAM. This conflict therefore may save a significant amount of time.

Following the scan of a particular record, determination operation 808 determines whether that record should be stored as part of its partition. The determination operation 808 filters the records so that only records that are relevant for its particular partition criteria are kept. Of course, the criteria used by the different determination operations 808 for the different threads 804a and 804b is different and relates to different, non-overlapping groups of records.

If determination operation 808 determines that a record does not satisfy the partition criteria for the thread, flow branches NO to reject record operation 810. Reject operation 810 removes the record from the thread so that it is not sorted along with the rest of the records. If determination operation 808 determines that a record satisfies the partition criteria, then flow branches YES to keep operation 812. Keep operation 812 keeps the record for sorting. In the age example described above, both filter operations 808 may evaluate record 202 (FIG. 2) and compare the age value, i.e., 21, against its filter criteria. One of the operations 808, e.g., operation 808 for thread 804a, determines that this value falls within its partition such that record is kept at operation 812 while the other operation 808, e.g., operation 808 for thread 804b, determines that this value is outside its partition and rejects the record at 810.

In a particular embodiment the code segment shown in Table 1 represents the filter function for any instance. In the code section below 'i' is the identification value of the processor on which the fragment of code is running. It varies between 1 to M (an integer value) if the system is using M processors.

TABLE 1

Filter Function

```
BOOLEAN FAllowRow(VALUE v)
{
    bucket_size = P/M;    //this is an integer since choosing a LCM
    if (i == 1)
    {
        if (v < values[bucket_size)
            return TRUE;
    }
    else if (i == M)
    {
        if (v >= values[(i-1) * bucket_size])
            return TRUE;
    }
    else
    {
        lower_bound = values[(i-1) * bucket_size];
        upper_bound = values[i * bucket_size];
        if (v >= lower_bound and v < upper_bound)
            return TRUE;
    }
    return FALSE;
}
```

Once all records have been scanned and filtered, then sort operation 814 sorts the records that have been kept. In another embodiment, the scan, filter and sort operations happen concurrently in an assembly line manner. That is, once a particular record has been scanned, it is passed to the filter module which then determines whether to keep the record. Once the record has been kept, the filter operation passes the record on to the sort module to determine its location in the sub-index. The sorting process is based on the key field, attribute or column that the index relates to. Additionally, the records may be further sorted based on secondary fields as well.

Once the records have been sorted, a sub-index is created based on the sorted records, i.e., the partition. The index creation is based only on the sorted records and may take several forms. In an embodiment, the sub-index is a data structure in the form of a B-Tree.

During the process of building the sub-index, the process gathers statistical information. This information relates to the relationship between the records based on the actual values within each record. For example, the statistics may relate to the number of employees of a particular age or title, etc.

Following the creation of the sub-index and the gathering of the statistical information at operation 816, allocate operation 818 allocates blocks or portions of the disk for storing the sub-index created by operation 816. Importantly, since each of the various threads, such as threads 804*a* and 804*b* are operating independently of each other the final sub-indices may be stored on interspersed blocks on the disk. Interspersing these blocks reduces the access time when the final index is being traversed. Consequently, block allocation operation 818 allocates blocks in predetermined groups so that substantially all of the sub-index information for each sub-index is stored in consecutive blocks. The predetermined number of blocks is or may be determined during the sorting process 814 wherein the number of records is evaluated and passed along to the allocation operation 818. The sorting operation 814 may also pass along information related to the size of each of the records so that the allocation operation 818 further appreciates the amount of space required to store the sub-index portions. Storing the index portions in consecutive blocks improves performance since the disk head does not have to be repositioned as often when traversing the final index.

In an alternative embodiment, the interspersing of index pages is avoided by synchronizing the allocation of the pages for various partitions among the parallel threads. In such a case, a cache of allocated pages is maintained and each thread retrieves a pre-determined number of database pages upon request. The number of pages to allocate upon each request may be determined by the size of the cache. The size of the cache may further depend on the size of the index being built and the number of currently available free pages in the system.

Once all the blocks have been allocated, layout operation 820 physically records the sub-index on the disk in the blocks allocated by allocate operation 818. Additionally, the layout operation 820 may further connect similar level elements of the sub-index for traversal purposes. That is, the linking of similar level elements may be done when the records for the sub-index are laid out on disk blocks. Following the layout of the sub-index on the disk, process 800 ends at end operation 822.

Figure 9:
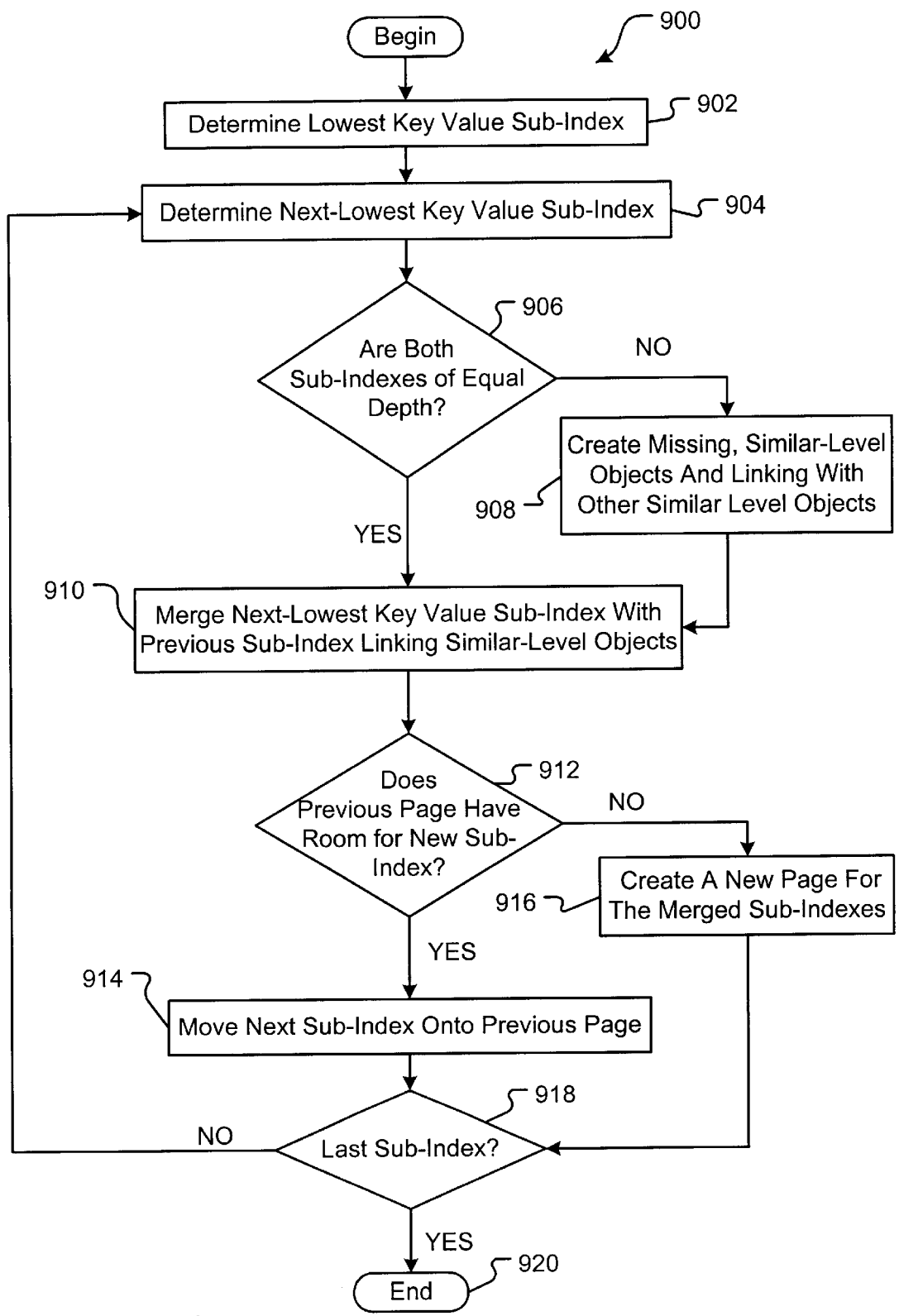
FIG. 9 is a flow diagram showing the operational characteristics performed in merging the indexes as part of the characteristics shown in FIG. 6.

Following the layout operation 820 of the sub-index on the disk, the merge phase begins, which merges the various sub-indexes created by flow 800 into a final, complete index. A flow diagram showing the operational characteristics performed in merging the sub-indexes is shown in FIG. 9.

Initially, the process 900 begins with determination act 902, wherein determination act 902 determines the lowest key value sub-index. Essentially, in creating a final index, the process 900 must "sort" the various sub-indexes. Therefore, determination act 902 determines the first sub-index that will represent the first portion of the final index. In this case, the lowest key value sub-index may appropriately be used to begin the sorting process. The lowest key value sub-index relates to the sub-index that indexes the set of records having the lowest values in the key field. As an example, if employee age were the key field for the final index, then the lowest key value sub-index would relate to the sub-index having the records of the youngest employees. In alternative embodiments, operation 902 may determine the highest key value sub-index.

Following the determination of the lowest key value sub-index, determine operation 904 determines the next-lowest key value sub-index. The next-lowest key value sub-index is the next consecutive sub-index following the lowest key value sub-index.

Once the next-lowest sub-index has been located, comparison operation 906 compares the relative heights or depths of the two sub-indexes. Essentially, each sub-index is created independently of the other and the two may have different structures, including different depths, i.e., structures having different numbers of levels. As shown in FIG. 3, the sub-indexes 326 and 328 have the same depth in terms of layers of index objects. That is, depth is determined based on the number of layers of index objects (as opposed to the number of records.) In some situations, the independently created sub-indexes may have different depths. In such a case, comparison operation 906 is used to evaluate the two indexes for this characteristic.

If comparison operation 906 determines that the two sub-indexes have different depths, then flow branches NO to create operation 908. Create operation 908 creates objects for the more shallow sub-index to fill the empty levels. Thus, create operation 908 equalizes the two sub-indexes in terms of depth. The actual objects that are created elate to simple pointer objects that direct any traversal downward to the next object. If there is no room to accommodate pointer objects, additional disk blocks may be allocated to accommodate these objects.

If comparison operation 906 determines that the two sub-indexes are equal in depth, or following create operation 908, merge operation 910 merges the next-lowest key value sub-index with the lowest sub-index. This process involves linking the similar level objects, the linking is bi-directional such that any traversal may proceed in either direction. Again, as shown in FIG. 3, the index may involve many layers or levels. At each level, the various objects are linked together by operation 910 to provide simple traversal capabilities. Additionally, merge operation 910 also creates an upper-level object, such as object 302 shown in FIG. 3, as a new root object for the two linked sub-indexes.

Following the linking of the similar-level objects, determination act 912 determines whether the pointer objects in the root of the two sub-indexes may fit on a single disk block or page. If so, then flow branches YES to move operation 914, which moves the next sub-index onto the previous page freeing the block of memory used for the subsequent sub-index. If there is no space to accommodate the combined set of sub-indexes, then flow branches NO to create operation 916 which creates a new page, and entries are made for both the previous and subsequent sub-indexes. Physical allocation in this manner insures that the various consecutive indexes are located in consecutive pages.

Once merged, determination act 918 determines whether there are more sub-indexes to be merged into the final index. If so, flow branches NO to operation 904 which determines the next sub-index for merging. If not, then flow branches YES and the operation ends at end step 918. In alternative embodiments, all the various sub-indexes may be determined at operation 904 such that the merge operation can simply operate on all sub-indexes relatively simultaneously.

Figure 10:
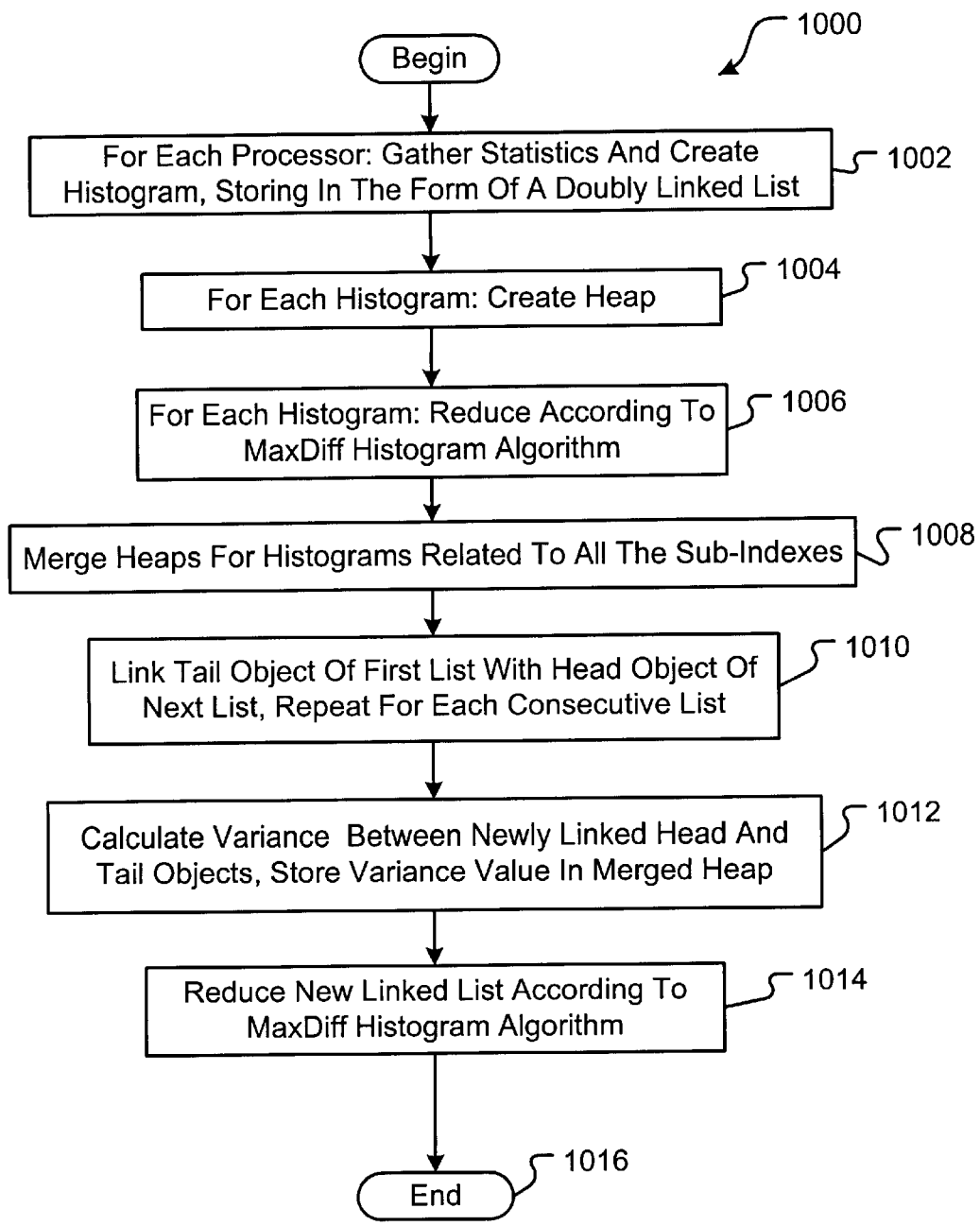
FIG. 10 is a flow diagram showing the operational characteristics performed in stitching the statistics as part of the characteristics shown in FIG. 6.

Following the merging of all the sub-indexes, the statistical information for all the sub-indexes must be stitched together. Essentially, each individual sub-index creation process gathered statistics on its sub-index and created a data structure to store such information. These data structures could be appended to each other, but such a resulting data structure could potentially be extensive in size and therefore a smaller, more manageable data structure is created. A flow diagram showing the operational characteristics, such as flow 1000 performed in stitching the statistics is shown in FIG. 10.

Flow 1000 begins with each processor gathering statistics during its creation of a sub-index. The process of gathering the statistics 1002 involves the creation of a histogram for these values which generates a series of steps. Each step relates to a distribution value for a particular range of values. As an example, for a particular sub-index related to the age of employees, a sub-index histogram may have a step indicating that thirty people are between the ages of 30 and 32. Operation 1002 implements the histogram of statistical information into a doubly linked list, wherein each object of the doubly linked list relates to a step of the histogram. The linked list has a predetermined number of objects, e.g., "k" objects wherein k is the number of steps in the histogram. The predetermined value k may be bounded to a manageable number such as 200 for particular sub-indexes. Additionally, each list has a head or first object and a tail or last object in the list.

Once the doubly linked list is created at operation 1002, create operation 1004 creates a heap of variance values between each consecutive object in the doubly linked list. These values are then used by reduce operation 1006 to reduce the doubly linked list according to the MaxDiff Histogram Algorithm described in more detail in U.S. patent application Ser. No. 09/652,942; entitled QUERY PLANNING USING A MAXDIFF HISTOGRAM, filed Aug. 31, 2000, which is referenced above. Essentially, the MaxDiff Histogram Algorithm reduces the number of objects in the doubly linked list by determining which two objects have the lowest variance between them and then combines these two objects into a single object. Therefore, reduce operation 1006 reduces each of the various histogram lists for each of the sub-indexes to a predetermined number of objects, e.g., 200.

Following reduce operation 1006, merge operation 1008 merges the heaps of the all the histograms, i.e., for all the related sub-indexes. Merging these heaps essentially combines the variance values for the different doubly linked lists. Once all the heaps are merged, link operation 1010 links each of the separate linked lists together to form one linked list. In order to link these lists, the tail object of the first linked list is linked to the head object of the next linked list. In this case, the "first" list relates to the doubly linked list for the first sub-index, i.e., the lowest key value sub-index as described above in conjunction with FIG. 9. Moreover the next list is the next consecutive or next-lowest list for the next-lowest valued sub-index. The linking process 1010 is repeated until all the separate linked lists are linked into one continuous linked list.

Upon linking the separate lists together, calculate operation 1012 calculates the variance value between the newly linked head and tail objects. This variance value is stored in the new merged heap.

Following the calculation of the new variance values, the resulting linked list is then reduced or compressed, by reduce operation 1014 to a predetermined number of objects. The reduction algorithm relates to the MaxDiff Histogram Algorithm that was used to reduce each individual linked list in operation 1006. The reduction relates to compressing or joining two objects or buckets that have the lowest variance value between them. Once joined, new variance values are generated between the new object at the objects that it is linked with. Following the generation of the new variance values, another compression may take place. This process is repeated until the list is reduced to a predetermined number of objects or until the variance values exceed a predetermined threshold.

Upon completion of the reduction operation 1014, the process ends at end operation 1016. The final linked list represents a histogram for the final index. Additionally, the linked list is reduced to a manageable number of objects that can be traversed and analyzed by the system.

Figure 11:
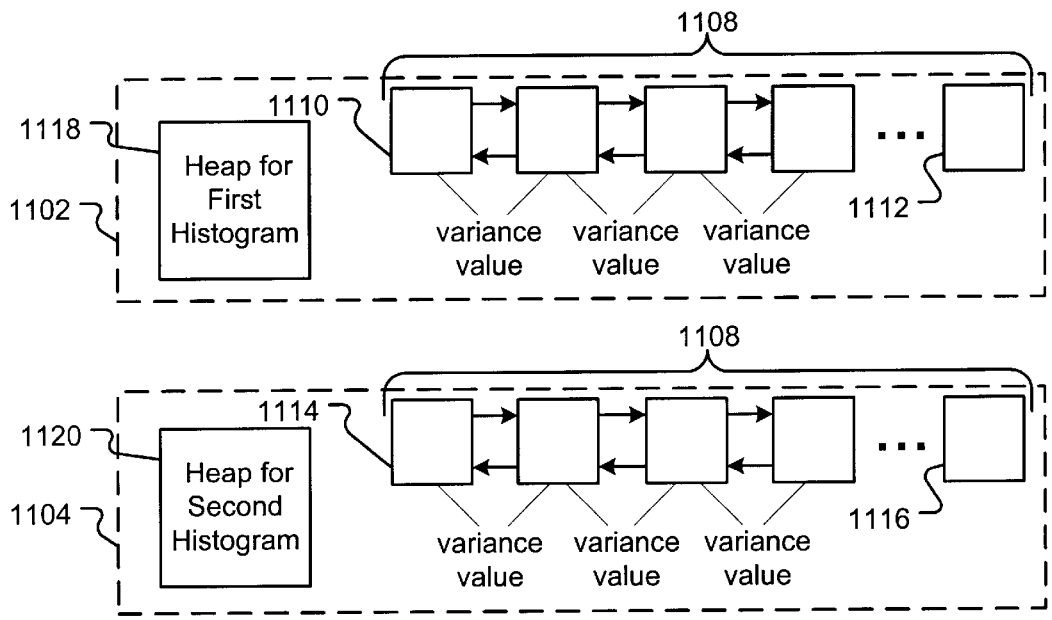
FIG. 11 illustrates separate histogram data structures related to separate sub-indexes.
Figure 12:
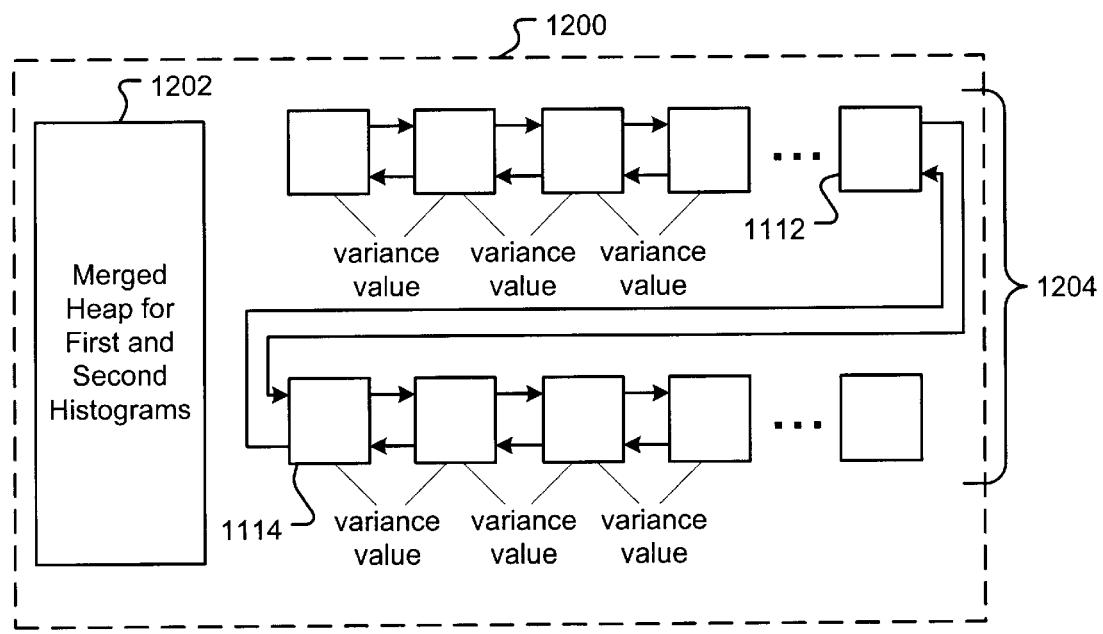
FIG. 12 illustrates a stitched combination of the two separate data structures shown in FIG. 11.

FIGS. 11 and 12 represent the stitching of two separate histogram representations. Initially, FIG. 11 illustrates two histogram data structures 1102 and 1104. Data structure 1102 represents histogram statistical information gleaned from creating a first sub-index, while data structure 1104 represents histogram statistical information gleaned from creating a second sub-index. Essentially, the data structures exist following operations 1002, 1004 and 1006 described above in conjunction with FIG. 10. Each data structure has a doubly linked list 1106 and 1108, respectively. The list 1106 relates to the first histogram of information and has a head object 1110 and a tail object 1112. The list 1108 relates to the second histogram of information and has a head object 1114 and a tail object 1116. Each structure 1102 and 1104 also has a heap 1118 and 1120, respectively, that contains variance value information between the objects of the linked lists.

Following the merge and link operations 1010 and 1012 (FIG. 10), a single data structure 1200 is created that represents statistical histogram information for the final index, as shown in FIG. 12. Data structure 1200 represents the combination of data structures 1102 and 1104 shown in FIG. 11. The list 1200 comprises a merged heap 1202, which comprises information from both heaps 1118 and 1120. The data structure 1200 also comprises a single linked list 1204. The list 1204 is a combination of the linked lists 1106 and 1108. The combination of the lists 1106 and 1108 results from a linking of tail object 1112 of list 1106 and head object 1114 of list 1108, as shown in FIG. 12. Once these objects 1112 and 1114 are linked, a new variance value is created with respect to the information in these objects, this new variance value being stored in heap 1202. Additionally, the data structure 1200 may be reduced according to the MaxDiff Histogram Algorithm as described above.

The above described system and method provides the ability to use all the processors in a multiprocessor system to perform index creation which significantly reduces the process time in creating an index. The above described method and system involves a preprocessing phase, which analyzes the database information and divides the various database records amongst multiple processors so that the different processors can operate independently in creating sub-indexes. Being able to work independently allows for considerable timesavings since no synchronization is required. Additionally since the groups information used by the different processors do not overlap, the process of merging the various sub-indexes does not require interleaving or meshing of the various index records which also improves performance.

Although the invention has been described in language specific to structural features, methodological acts, and computer readable media containing such acts, it is to be understood that the invention defined in the appended claims is not necessarily limited to the specific structure, acts or media described. As an example, other index creation methods that do not gather statistical information may still benefit from the principles of the present invention. Therefore, the specific structure, acts or media are disclosed as preferred forms of implementing the claimed invention.

What is claimed is:

1. A method of creating an index for a database table of records, the method occurring in a computer environment having a plurality of processing units wherein each processing unit has access to the table, the method comprising:

determining partition delimiters, each partition delimiter separating the table into non-overlapping partitions of records, each partition dedicated to one processing unit for index creation;

independently creating a plurality of sub-indexes, wherein at least two sub-indexes are created by different processing units;

gathering sub-index statistical information and stitching sub-index statistical information, wherein gathering sub-index statistical information comprises:
  evaluating record field information;
  generating a histogram relating to the evaluation of the record field information;
  creating a linked list of data objects related to the histogram;
  determining variance values between consecutive data objects and storing the variance values in a heap; and
  reducing the linked list by combining data objects having a relatively low variance value between the respective data objects; and merging the sub-indexes together to create a final index related to the table.

2. A method as defined in claim 1 wherein the act of creating the sub-indexes further comprises sorting the records and generating a data structure based on the sorted records.

3. A method as defined in claim 2 wherein the data structure is a B-Tree data structure.

4. A method as defined in claim 2 wherein the data structure has multiple levels.

5. A method as defined in claim 2 wherein the data structure is a clustered index.

6. A method as defined in claim 1 wherein the act of stitching the sub-index statistical information comprises:

merging the heap information for each sub-index;

linking the linked lists for each sub-index to create a stitched linked list;

determining variance values between linked objects;

determining a relatively low variance value; and reducing the stitched linked list by combining linked objects associated with the relatively low variance value to created a combined data object.

7. A method as defined in claim 6 wherein the combined data object is linked within the stitched linked list to a previous data object and a subsequent data object, wherein the method further comprises:

calculating a first variance value between the combined data object and previous data object and a second variance value between the combined data object and the subsequent data object, the new variance values being stored in the merged heap; and reducing the stitched linked list to a predetermined number of objects based on stored variance values.

8. A computer program product readable by a computer and encoding instructions for executing the method recited in claim 7.

9. A method as defined in claim 6 wherein the combined data object is linked within the stitched linked list to a previous data object and a subsequent data object, wherein the method further comprises:

calculating a first variance value between the combined data object and previous data object and a second variance value between the combined data object and the subsequent data object, the new variance values being stored in the merged heap; and reducing the stitched linked list until the lowest variance value is above a predetermined threshold value.

10. A computer program product readable by a computer and encoding instructions for executing the method recited in claim 9.

11. A computer program product readable by a computer and encoding instructions for executing the method recited in claim 6.

12. A method as defined in claim 1 wherein the method is initiated by an index creation manager module.

13. A method as defined in claim 1 wherein the method is initiated by a query manager in response to a supplied query.

14. A method as defined in claim 1 wherein the method is initiated automatically in response to a modification to the table.

15. A method as defined in claim 1 wherein the act of determining partition delimiters comprises:

sampling the table records to determine an approximate distribution of the values in the key field;

creating a histogram based on the sampled information; and evaluating the histogram to determine the partition delimiters.

16. A method as defined in claim 15 further comprising:

determining a processor goal value based on the number of processors in the computer system;

determining a least common multiple value based on the processor goal value;

determining whether the histogram information may be substantially evenly split into the least common multiple value number of partitions;

if so, creating the partition delimiters based on the least common multiple value; and if not, adjusting the processor goal to determine a new least common multiple value to determine partition delimiters.

17. A computer program product readable by a computer and encoding instructions for executing the method recited in claim 16.

18. A computer program product readable by a computer and encoding instructions for executing the method recited in claim 1.

* * * * *